(12) United States Patent
Bugnet et al.

(10) Patent No.: US 8,563,150 B2
(45) Date of Patent: Oct. 22, 2013

(54) DEVICE FOR CATALYTIC RECOMBINATION OF GASES FOR ALKALINE BATTERIES WITH SHORTENED ZINC ANODE

(75) Inventors: Bernard Bugnet, Le Plessis-Trevise (FR); Denis Doniat, Paris (FR); Robert Rouget, Paris (FR)

(73) Assignee: S.C.P.S., Rosny-sous-Bois (FR)

( * ) Notice: Subject to any disclaimer, the term of this patent is extended or adjusted under 35 U.S.C. 154(b) by 865 days.

(21) Appl. No.: 11/830,975

(22) Filed: Jul. 31, 2007

(65) Prior Publication Data

US 2008/0003489 A1  Jan. 3, 2008

Related U.S. Application Data

(63) Continuation of application No. PCT/IB2005/000285, filed on Feb. 2, 2005.

(51) Int. Cl.
*H01M 10/52* (2006.01)

(52) U.S. Cl.
USPC .............................................. 429/57; 429/59

(58) Field of Classification Search
USPC .............................................. 429/122, 57–58
See application file for complete search history.

(56) References Cited

U.S. PATENT DOCUMENTS

| | | | | |
|---|---|---|---|---|
| 4,447,508 A | * | 5/1984 | Jensen | 429/57 |
| 5,069,988 A | | 12/1991 | Tomantschger | |
| 5,506,067 A | * | 4/1996 | Tinker | 429/27 |
| 5,563,004 A | * | 10/1996 | Buzzelli et al. | 429/27 |
| 5,660,943 A | * | 8/1997 | Lin | 429/59 |
| 6,007,946 A | * | 12/1999 | Yano et al. | 429/223 |
| 6,017,655 A | * | 1/2000 | Ovshinsky et al. | 429/232 |
| 6,060,195 A | * | 5/2000 | Shinyama et al. | 429/223 |
| 6,280,878 B1 | * | 8/2001 | Maruyama et al. | 429/233 |
| 6,428,922 B2 | * | 8/2002 | Bailey | 429/57 |
| 6,544,686 B1 | * | 4/2003 | Ein-Eli et al. | 429/206 |
| 6,902,845 B2 | * | 6/2005 | Tani et al. | 429/218.2 |
| 2002/0197530 A1 | * | 12/2002 | Tani et al. | 429/218.2 |

FOREIGN PATENT DOCUMENTS

| | | |
|---|---|---|
| EP | 0979673 | 2/2000 |
| FR | 2737507 | 2/1997 |
| FR | 2788887 | 7/2000 |
| WO | 98/26112 | 6/1998 |
| WO | 02/47806 | 6/2002 |

* cited by examiner

*Primary Examiner* — Maria J Laios
(74) *Attorney, Agent, or Firm* — Strum & Fix LLP

(57) ABSTRACT

The invention concerns a device for catalytic recombination of gases for alkaline batteries with shortened zinc anode. The invention concerns a device for catalytic recombination of gases formed when charging a zinc anode alkaline battery, characterized in that it consists of a catalytic mass in contact with a crosslinked cellular metal foam serving as catalyst support and heat dissipating structure, said catalytic mass consisting of a mixture of carbon black including metal of platinum metals, and of a hydrophobic binder, the whole assembly being heat-treated to cause the hydrophobic binder of said catalytic mass to be sintered. Said device is advantageously connected to one of the terminals of the battery or to any other metal part constituting part of the cover of the battery case, so as to promote discharge of the calories produced. Such a device enables, in a long lasting manner during the charge-discharge cycles, limited internal pressure levels to be maintained, in particular in installations designed to operate without maintenance.

11 Claims, 1 Drawing Sheet

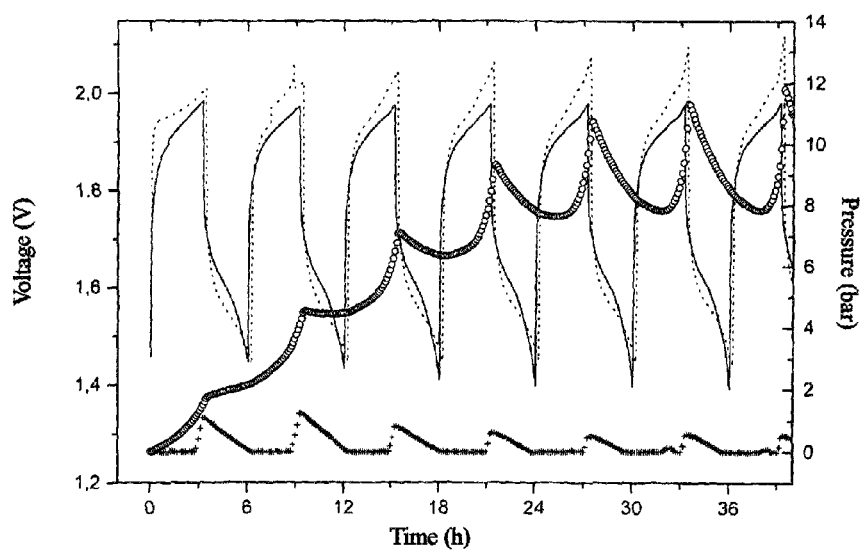

US 8,563,150 B2

DEVICE FOR CATALYTIC RECOMBINATION OF GASES FOR ALKALINE BATTERIES WITH SHORTENED ZINC ANODE

CROSS REFERENCE TO RELATED APPLICATIONS

This application is a Continuation application of PCT/IB2005/000285 filed Feb. 2, 2005, which is incorporated by reference herein in its entirety.

BACKGROUND OF THE INVENTION

1. Field of the Invention

The present invention relates to the field of electrochemical generators, and more particularly that of alkaline batteries with zinc anode.

2. Description of the Related Art

It is known that batteries with an aqueous electrolyte consume water in the course of their operation, and more specifically during the overcharge required for a complete charging of the battery, which produces a decomposition of the water of the electrolyte into hydrogen and oxygen.

There are various ways of managing said consumption of water, in particular:
- by limiting the overcharge, at the risk, however, of charging the battery insufficiently;
- by using a large excess of electrolyte so as to limit the frequency of the additions of water, a situation which can however be applicable only to stationary sets of batteries, by reason of the excessive loads and volumes that result from it.

These solutions do not permit the need for periodic interventions by the user, of a more or less frequent nature, to be avoided.

There have been manufactured for a long time maintenance-free, so-called sealed, alkaline batteries, which are nevertheless still fitted with a safety valve opening in the event of excessive internal pressure of the element.

Said batteries employ the principle of the recombination of the decomposition gases of the water. Current examples are the nickel-cadmium (NiCd) and nickel-metal hydride (NiMH) alkaline batteries with cylindrical or prismatic formats which are fitted to portable electric and electronic devices (telephones, computers, . . . ).

The negative electrode there is oversize in capacity terms compared with the positive electrode in a ratio that varies from 1.2 to 1.5 approximately in most cases.

When the positive nickel electrode is completely charged, the voltage of the cell rises, marking the start of the evolution of oxygen, said evolution resulting from the electrochemical oxidation of the water.

During the surcharge of said cathode, the negative electrode continues to be charged.

The oxygen formed at the level of the positive electrode diffuses towards the anode of cadmium or metal hydrides and recombines, either with the metallic cadmium or with the hydrogen adsorbed in the metal hydride. Said diffusion is facilitated by the use of a separator permeable to oxygen and by the use of a reduced quantity of electrolyte.

In an alkaline battery, the reactions observed at the level of the negative electrode are as follows, where M is the metal participating in the reaction:

at the positive electrode: $2OH^- \rightarrow H_2O + \frac{1}{2}O_2 + 2e^-$. [1]

at the negative electrode: $M + \frac{1}{2}O_2 \rightarrow MO$ [2]

$MO + 2e^- + H_2O \rightarrow M + 2OH^-.$ [3]

French patent 2 788 887 describes the principle of alkaline secondary electrochemical generators with zinc anode, as well as a simple and economic technology of production, which allows high levels of performance to be achieved, in particular in terms of cycle life.

The invention which is the subject of said document relates more particularly to the employment of a zinc negative electrode of the impasted-plasticised type, the active mass of which is composed of a mixture containing at least zinc oxide, a fine conductive ceramic powder and a plastic binder.

According to said technology, the anodic active mass formed as a paste, which is obtained after mixing of the various components and a diluent, is introduced into a three-dimensional collector advantageously consisting of a cross-linked copper foam.

The alkaline batteries with zinc anode, such as nickel-zinc (NiZn) or silver-zinc (AgZn), produced by the assembling of zinc electrodes manufactured as described above, and of nickel or silver cathodes, likewise of the impasted-plasticised type, in a nickel foam support, exhibit an excellent aptitude for cycling, and offer performance levels comparable with or higher than those of the other alkaline secondary generators with nickel positive electrodes. They have, in addition, the advantage of reduced cost and the absence of heavy metals.

The NiZn or AgZn batteries of said technology can operate in "open" mode or in "semi-sealed" or else "sealed" mode.

The general operating principles that apply to NiCd and NiMH alkaline batteries also apply to batteries with zinc anode. Thus, in particular, the zinc negative electrode has surplus capacity compared with the positive electrode.

However, in the case of the nickel-zinc batteries produced according to the technology described in French patent 2 788 887, the surplus capacity of the zinc electrode does not exceed about 20% of the capacity of the nickel electrode, which represents a major difference compared with what is conventionally described in the literature, where the zinc anode generally exhibits a surplus capacity of 250 to 500%, in order to reduce artificially the level of discharge of the anode and to increase its cycle life.

In "open" mode, the end of the charging of the battery is accompanied by a release of oxygen at the positive electrode, and then of hydrogen at the negative electrode when the charging is continued. A periodic addition of water is necessary, corresponding to the quantity of electrolyte decomposed.

In "semi-sealed" mode, the battery is fitted with a valve which opens at a low pressure of between 10 and 20 kPa. The oxygen formed recombines partially with the metallic zinc of the anode, according to the reaction:

$Zn + \frac{1}{2}O_2 \rightarrow ZnO$ $ZnO + 2e^- + H_2O \rightarrow Zn + 2OH^-$ The zinc oxide is itself in equilibrium with the soluble form of the zinc in alkaline medium, zincate, according to the following simplified equation:

$ZnO + 2OH^- + H_2O \leftrightarrows Zn(OH)_4^{2-}$

In "sealed" mode, all of the gases formed must recombine in order to prevent an excessive increase in the internal pressure.

The operating principle of a sealed nickel-zinc battery such as that described above has its limitations for various reasons:
- an excessive and uncontrolled charging that will lead to an excessive production of oxygen, the kinetics of reaction [1] prevailing over those of reactions [2] and [3], as a result of the phenomenon described above, aggravated by a slower diffusion of the oxygen towards the negative electrode, the latter is completely charged, and a release of hydrogen then occurs:

$$H_2O + e^- \rightarrow OH^- + \tfrac{1}{2}H_2$$

the metallic zinc is thermodynamically unstable, and tends to corrode with the formation of hydrogen:

$$Zn + 2H_2O \rightarrow Zn(OH)_2 + H_2 \nearrow$$

The mode of management of the gases formed, oxygen and hydrogen, is a function of the design of the battery and its manufacture, the increase in internal pressure promoting the recombination of gas at the level of the electrode of opposite polarity to that where it forms, but being acceptable only within narrow limits in certain types of case.

Thus, an element of cylindrical shape with metallic case and cover supports pressures of more than 2000 kPa, while prismatic elements will accept maximum pressures of between 500 and 1000 kPa, as a function of the dimensions of the battery, the nature of the materials and the case/cover connection mode. On safety grounds, the covers of recombination batteries are fitted with valves. They are set to about 1500 kPa for cylindrical elements, and up to 200 kPa for prismatic formats.

The formation of hydrogen and its management constitute a particularly important aspect of the operation of a sealed nickel-zinc battery.

Various solutions have been proposed for limiting the pressure increase caused by the formation of hydrogen, including:
- the use of catalysts based on silver, for example, which are incorporated in the positive electrode, and permit oxidation of the hydrogen during the charging according to the reaction:

$$H_2 + 2OH^- \rightarrow 2H_2O + 2e^-$$

- the use of a third electrode, connected to the positive electrode and ensuring oxidation of the hydrogen;
- the use of a catalytic structure consisting of carbon and platinum, which is deposited on a metallic collector or a carbon tissue responsible for ensuring the recombination of the hydrogen and the oxygen.

Said various solutions are not however fully satisfactory, either because of a limited kinetics of oxidation of the hydrogen or because of a complex construction.

One of the limitations on the use of a catalytic structure for the recombination of hydrogen and oxygen is the heat management constraint of the system. The reaction between hydrogen and oxygen is highly exothermic, in fact, and can lead to a substantial increase in temperature, and to the formation of "hot spots" harmful to the efficient operation of the catalyst. It is therefore necessary to ensure a rapid removal of the calories produced during the recombination reaction.

Moreover, and this is another difficulty affecting the practical employment of catalytic structures, the water formed during the recombination of hydrogen and oxygen must not restrict access of the gases to the catalytic sites.

The aim of the present invention is to meet these various requirements: to this end, the inventors have developed catalytic structures using metal foams as supports, and an implementation suited to the intended use.

Said aim is achieved by a device for the catalytic recombination of gas for alkaline batteries with zinc anode, as well as an alkaline battery with zinc anode containing such a device, such as are defined in the claims.

The invention relates to a device for catalytic recombination of the gases formed during charging of an alkaline battery with zinc anode, characterised in that it is composed of a catalytic mass arranged in contact with a cross-linked cellular metal foam serving as catalyst support and heat dissipating structure, said catalytic mass being composed of a mixture of carbon black, including a platinum group metal and a hydrophobic binder, the whole being subjected to a heat treatment so as to cause the hydrophobic binder of said catalytic mass to be sintered.

Metal foams are widely used today in the alkaline battery industry as supports/collectors of electrodes. Said forms are made from a cross-linked cellular organic porous substrate, with open pores. The preferred substrates are polyurethane foams, commercial grade, exhibiting a good regularity of structure.

The methods of manufacture most widely used consist in rendering the organic foam conductive by an electronic conductive deposition, in then metallising it by electrochemical deposition(s), then removing any organic material by heat treatment, and finally in deoxidising and annealing the metal, the alloy or the deposited metals constituting the final cross-linked structure, which must retain its initial substantially or totally open porosity. These methods make it possible, in particular, to produce foams of nickel, of copper, or of alloys based on said metals, that are usable within the scope of the invention.

Within the scope of the present invention, as regards the recombination of the gases formed during the charging of the battery, the metal foam employed plays a dual role: it serves on the one hand as support for the catalyst of the reaction, and on the other it contributes to ensuring the removal of the calories produced on the recombination of the hydrogen and the oxygen.

As regards the heat dissipation, the latter is performed by radiation, convection and/or conduction. Said dissipation is all the better if the metal constituting the metal foam is itself a good conductor of heat. In order to optimise said characteristic, it is advantageous, in one of the embodiments of the invention, to use a copper foam, said metal being an excellent conductor of heat.

For such an embodiment, it will be advantageous to use foams of copper or alloys of copper, such as those that can be produced industrially under economic conditions according to the process described in French patent no. 2 737 507.

SUMMARY OF THE INVENTION

It is furthermore necessary that the metal foam is chemically inert under its conditions of use, and in particular both with respect to the catalytic reaction and the reactive gases and in the alkaline electrolyte of the battery. A protective coating can to this end be applied to the surface of the lattices of the foam, on any metal or alloy that would not satisfy these conditions.

Thus, it is necessary in particular, for an employment of a copper foam, that the surface of its lattices is covered with a surface coating protecting the copper from the corrosion occurring in the presence of oxygen. Said protective coating can, for example, be a coating of nickel, which can with advantage be produced by electrolysis, and exhibit a good continuous covering quality and offer effective chemical protection and good thermal behaviour.

Although the circulation of the gases in the space situated between the top of the electrodes and the cover of the battery is limited, it is important to ensure that the gases are able to pass within the catalytic structure, which will moreover preferably be designed in such a way that the distance between the device and a collector for removing heat to the outside of the battery is as short as possible.

The advantage of a structure of the foam type compared with a plane support or one with less tortuousness or less developed surface, such as an expanded metal, is that it provides a high density of lattices per unit area, hence a sizeable developed surface, and very ample access to the heart of the structure.

Thus, it will be possible to construct the catalytic device in such a way that the catalyst is fixed to the lattices of the foam support by any suitable means, and covers the lattices of said foam, while at the same time ensuring that the latter retains a high porosity that will allow easy circulation of the oxygen and the hydrogen within it.

Dissipation by conduction is naturally the major mode of removal of the calories produced on the recombination of the gases. Within the scope of the invention, and in order to promote the effectiveness of said mode of dissipation, it is possible with advantage for the structure covered with catalyst to be connected by any means, in particular by one of its ends, to one of the terminals of the battery, which will act as heat removal collector, in order to benefit from the "radiator" effect provided by the electrodes fixed to terminals protruding from the battery, and hence in contact with the external air. The part of the catalytic structure that is thus placed in contact with one of the terminals of the battery can with advantage be devoid of deposition of catalyst, in the interests of a better heat transfer between two metal surfaces. It can also be laminated, in order to provide a better contact surface.

It is also possible to fix by any suitable means, and more particularly to weld, the whole or part of the metal foam, in particular an end or an edge devoid of catalyst, to a metal part or plate capable of constituting the whole or part of the cover of the battery, in order to promote a removal of the calories to the outside of the battery.

In cases where a case and a cover of plastics material (nylon, ABS, NORYL©, . . . ) are used, the metal part or plate can be crimped into the cover, and communicate with the outside of the case.

The cross-linked metal foam used as support of the catalyst in the device according to the invention can be chosen from a wide range of pore sizes, and in particular from grade 30 PPI (linear Pore Per Inch) inclusive (mean pore diameter of about 0.8 mm) to grade 90 PPI inclusive (mean pore diameter of about 0.2 mm).

Metal foams according to the invention can be used in a very wide range of densities, the main constraints that are imposed in this respect being on the one hand the retention of a sufficient open porosity in said support structure, and on the other the possession of a sufficiently effective thermal drainage system, the nature of the metal or alloy chosen also having an influence in this area.

For initial thicknesses of the foam, prior to possible compression, of generally between one and three millimeters, it is possible with advantage to use densities of between 200 and 1500 mg/cm$^2$ of apparent surface.

It is naturally possible to produce a catalytic recombination device by superimposing a plurality of ribbons of foam, one at least of which is coated with catalyst, without exceeding the scope of the present invention.

The catalysts applied in contact with the metal foam support, in order to constitute a catalytic recombination device according to the invention, are those that enable the combination reaction between the oxygen and the hydrogen to be catalysed. These can with advantage be catalysts based on platinum groups metals, such as in particular platinum and palladium, and capable of combining said metals with carbons or graphite, and in particular carbon black.

The catalytic mass is composed of a carbon black mixture including a platinum group metal and a hydrophobic binder, the whole being subjected to a heat treatment in order to ensure the sintering of the hydrophobic binder of said catalytic mass.

Preferably the catalytic mass is composed of a mixture of carbon black on which platinum has been deposited.

With advantage, the catalytic mass is introduced into the foam by rolling or compression, or by spraying.

The invention also relates to an alkaline battery with zinc anode, characterised in that it comprises, inside its case, a device for catalytic recombination of the gases formed during the charging of the system, composed of a catalytic mass arranged in contact with a cross-linked cellular metal foam which serves as a catalyst support and a heat dissipating structure.

DETAILED DESCRIPTION OF THE PREFERRED EMBODIMENT

Preferably the device for catalytic recombination of the gases is connected to one of the terminals or to a metal part of the cover of the battery.

There are described below, as non-limiting illustrations of the invention, four examples of the use of metal catalytic recombination structures, which enable the benefits of said invention to be assessed.

Example 1

Carbon black on which platinum has been deposited is mixed in a proportion of 10% by weight with mineral oil whose boiling point is 200° C. PTFE is then added in the form of 60% aqueous suspension, in a proportion of 40% by weight expressed in solid matter. The whole is mixed until a paste constituting the catalytic foam is obtained.

In addition, a ribbon of nickel foam is cut, of grade 45 PPI (mean size of the pores about 0.6 mm), which is 2.5 mm thick, 100 mm long and 15 mm wide and has a density of 50 mg/cm$^2$ of apparent surface.

The paste obtained previously is rolled in the form of a 1 mm thick sheet, and a strip 100 mm long and 5 mm wide is cut off. Said strip is placed on the foam ribbon, centred on the latter, and the whole is rolled until the paste enters the foam. The whole is treated under nitrogen at 300° C. for 10 minutes in order to ensure the sintering of the hydrophobic binder.

The structure obtained is rolled up in spiral form and placed in a prismatic NiZn battery element of 30 Ah capacity, containing a reduced volume of electrolyte. The cover of the battery is fitted with a pressure gauge allowing the trend in the internal pressure of the element during the charge and discharge cycles to be monitored.

One of the ends of the foam is connected to one of the polarities of the battery, without there being the possibility of contact between the spiral and the top of the separators, in order to avoid any risk of polarisation of the catalytic structure through an ionic continuity. It is possible to avoid such a contact risk by means of a spacer of organic material.

The battery case is then closed. The battery is subjected to a cycling at the rate of C/4 amperes or 7.5 A for a 30 Ah battery, without monitoring of the voltage of the element at the end of charging. FIG. 1 shows the trend in the internal pressure of the battery without (curve 1A) and with (curve 1B) catalytic recombination structure according to the invention. It is found that the catalytic structure improves in particular the recombination of hydrogen with oxygen, and enables a weak internal pressure to be maintained. Curves 2A and 2B of FIG. 1 correspond to the voltage values of the battery during the cycles without catalytic structure and with said structure respectively.

After more than 10000 hours of operation, no increase in the internal pressure of the battery linked to a loss of activity of the catalyst is observed. The limiting pressure values to which the catalytic structure according to the invention may be confined, are compatible with operation in sealed mode (without maintenance) of a prismatic nickel-zinc battery using a plastic case that can be provided with a safety valve set for opening at 2 bar (about 200 kPa).

Example 2

A suspension in water of carbon black on which palladium has been deposited in a proportion of 10% by weight is prepared. PTFE is added in the form of aqueous suspension to the strongly agitated water-carbon black mixture, in a proportion of 30% by weight.

The suspension is filtered, and the carbon black-PTFE mixture is washed. After drying, the powder obtained is suspended in water and dispersed by means of a sonificator.

A nickel foam of grade 60 PPI (mean pore size about 0.4 mm) is used, 2 mm thick, 50 mm in length and 15 mm in width, with a density of 55 mg/cm$^2$ of apparent surface. The dispersion of the catalytic powder obtained previously is sprayed by means of a spray gun used for thin layer chromatography. A plurality of sprayings is carried out with, between each of them, a drying that can be performed with a hot air pistol. The operation is carried out on the two faces of the foam, in order to ensure a complete covering of the lattices of the foam, without however closing its porosity. Care is taken that one of the ends of the ribbon is devoid of any catalyst deposit over a length of 10 mm.

The structure thus obtained is then oven dried at 100° C. under air, then subjected to a heat treatment at 300° C. under nitrogen for 15 minutes.

The catalytic structure is placed in an NiZn battery similar to that described in Example 1, the end of the ribbon not coated with catalyst being connected to one of the polarities by welding onto the part of the terminal situated inside the battery. In cycling conditions identical to those described previously, the trends in the internal pressure correspond substantially to those of curve 1B of FIG. 1, staying less than 2 bar (about 200 kPa).

Example 3

A catalytic structure according to Example 2 is prepared, the end of the foam devoid of catalyst being spot welded to a steel metal plate which has been crimped beforehand into the nylon cover of the case.

Under cycling conditions identical to those described in Example 1, the trends in the internal pressure are similar to those of curve 1B of FIG. 1.

Example 4

A catalytic structure according to the invention is prepared, by application of the operating method described in Example 1, the nickel foam of grade 45 PPI being replaced here with a copper foam of the same grade, but of density 35 mg/cm$^2$, on which a protective nickel deposit of 20 mg/cm$^2$ has been provided by electrolysis.

Under operating conditions identical to those described in Example 1, it is found that the internal pressure of the battery follows once again a trend similar to that described by curve 1B of FIG. 1.

Naturally, and as moreover follows to a large extent from the above, the invention is not limited to the particular embodiments which have been described as examples. The invention is not limited to the illustrations that have been given of it, but includes all variants thereof.

The invention claimed is:

1. Alkaline battery having:
a zinc anode,
a cathode,
a separator and
an alkaline electrolyte solution,
further comprising a device for catalytic recombination of the gases formed during the charging of the system, said device being composed of a catalytic mass arranged in contact with a cross-linked cellular metal foam serving as catalyst support and heat dissipating structure, said catalytic mass being composed of a mixture of carbon black including a platinum group metal and a hydrophobic binder, the whole having been subjected to a heat treatment so as to cause the hydrophobic binder of said catalytic mass to be sintered;
said device for catalytic recombination being connected to one of the terminals or to a metal part of the cover of the battery which is in contact with external air, without there being any contact between said catalytic mass and the separators, in order to avoid any risk of polarization of the catalytic structure through an ionic continuity.

2. Alkaline battery according to claim 1, wherein the metal foam is composed of nickel, or of nickel-based alloy, and exhibits a substantially or completely open porosity.

3. Alkaline battery according to claim 1, wherein the metal foam is composed of copper, or of copper-based alloy, and exhibits a substantially or completely open porosity.

4. Alkaline battery according to claim 1, wherein the metal foam comprises lattices which are covered with a protective coating intended to ensure a chemical inertia of the foam in the conditions of its use.

5. Alkaline battery according to claim 1, wherein the foam is impregnated with the catalytic mass.

6. Alkaline battery according to claim 1, wherein the catalytic mass is composed of a mixture of carbon black having a platinum coating.

7. Alkaline battery according to claim 1, wherein the metal foam used exhibits a mean pore diameter of between about 0.2 and 0.8 mm.

8. Alkaline battery according to claim 1, wherein the metal foam used exhibits a density of between 200 and 1500 mg/cm$^3$ of apparent surface.

9. Alkaline battery according to claim 1, said alkaline battery being sealed.

10. Alkaline battery having:
a zinc anode,
a cathode,
a separator and
an alkaline electrolyte solution,
further comprising a device for catalytic recombination of the gases formed during the charging of the system, said device being composed of a catalytic mass arranged in contact with a cross-linked cellular metal foam serving as a catalyst support and heat dissipating structure, said catalytic mass being composed of a mixture of carbon black including a platinum group metal and a hydrophobic binder, the whole having been subjected to a heat treatment so as to cause the hydrophobic binder of said catalytic mass to be sintered;

one end of said metal foam being connected to one of the polarities of the battery or to a metal part or plate constituting the whole or part of the external cover of the battery, without there being the possibility of contact between said metal foam and the separators, in order to avoid any risk of polarization of the catalytic structure through an ionic continuity.

11. Alkaline battery having:

a zinc anode, a cathode, a separator and an alkaline electrolyte solution, further comprising a device for catalytic recombination of the gases formed during the charging of the system, said device being composed of a catalytic mass arranged in contact with a cross-linked cellular metal foam serving as a catalyst support and heat dissipating structure, said catalytic mass being composed of a mixture of carbon black including a platinum group metal and a hydrophobic binder, the whole having been subjected to a heat treatment so as to cause the hydrophobic binder of said catalytic mass to be sintered;

said catalytic mass being in spiral form and one end of said metal foam being connected to one of the polarities of the battery, without there being the possibility of contact between said spiral and the separators, in order to avoid any risk of polarization of the catalytic structure through an ionic continuity.

* * * * *